United States Patent [19]

Burnham

[11] Patent Number: 4,867,361

[45] Date of Patent: Sep. 19, 1989

[54] CARTOP LUGGAGE CARRIER

[76] Inventor: Charles R. Burnham, 95 Hickory Hill, Newington, Conn. 06111

[21] Appl. No.: 161,677

[22] Filed: Feb. 29, 1988

[51] Int. Cl.$^4$ .............................................. B60R 9/04
[52] U.S. Cl. .................................. 224/310; 224/328; 224/329
[58] Field of Search ............... 224/328, 329, 325, 327, 224/320, 315, 316, 310

[56] References Cited

U.S. PATENT DOCUMENTS 2,812,992  11/1957  Lysen ................................. 224/329
3,225,475  12/1965  Shank ................................. 224/329

FOREIGN PATENT DOCUMENTS 3104651  9/1982  Fed. Rep. of Germany ...... 224/320
2445246  8/1980  France ................................. 224/328

Primary Examiner—Renee S. Luebke
Attorney, Agent, or Firm—Robert S. Smith

[57] ABSTRACT

A luggage carrier for carrying luggage on the roof of a vehicle which includes a luggage platform, first and second concentric cover sections, and apparatus for mounting each of the cover sections for movement in a first direction.

16 Claims, 5 Drawing Sheets

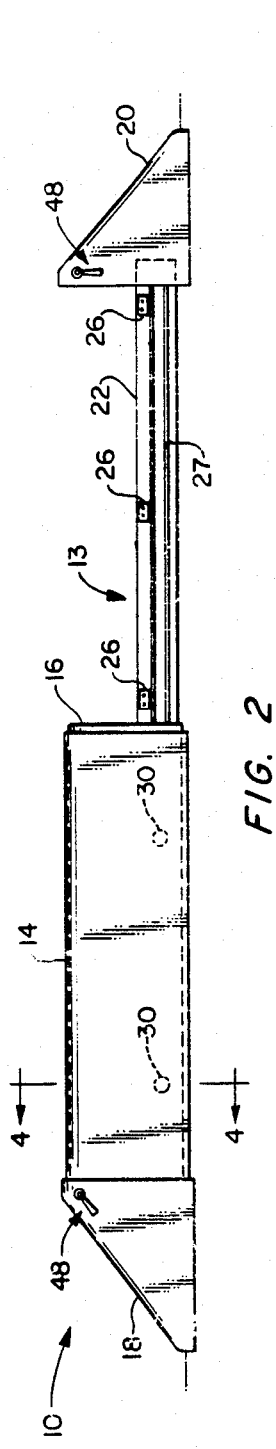
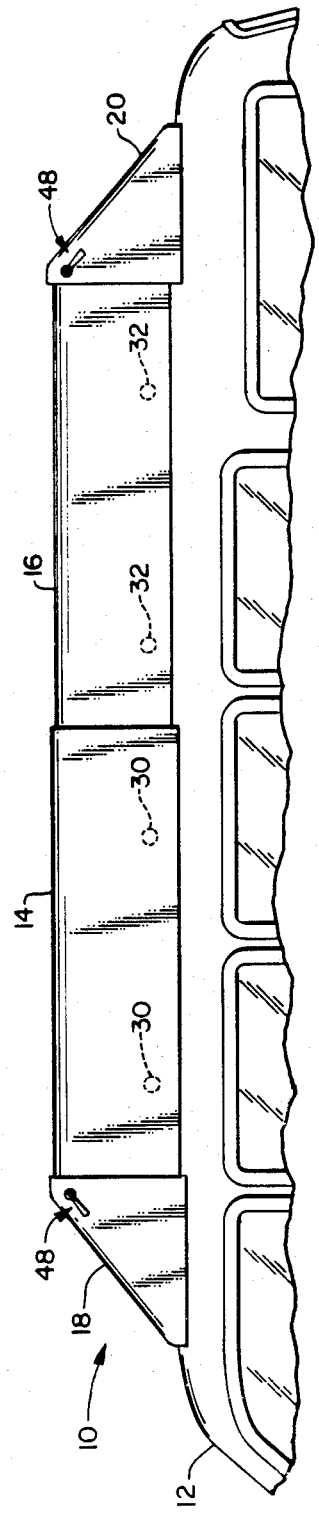
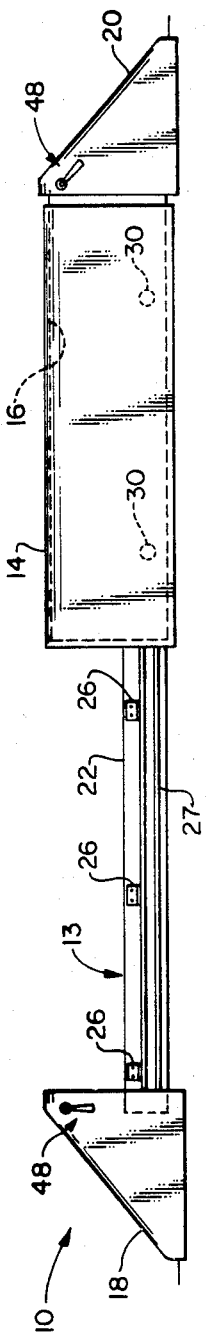

CARTOP LUGGAGE CARRIER

BACKGROUND OF THE INVENTION

The present invention relates to the general field of cartop luggage carriers, and more specifically to those carriers used on commercial limousines carrying several passengers. The prior art in this field includes the following U.S. Pat. Nos.
 4,317,534 Louw;
 4,345,706 Benit;
 4,354,625 Peoples;
 4,376,611 Koop;
 4,449,657 Moran;
 4,489,869 Weinhold.

Louw's device is an enclosed compartment, with sliding panels on one or both sides for access, and may contain internal partitions for compartmentalization. It mounts on a pair of transverse bars that are secured to the vehicle's roof gutters.

Benit's design utilizes a base, secured to the roof gutters, and a cover—essentially an inverted box—one edge of which is hinged to the base. The edge of the cover opposite the hinge is raised to allow access for loading. Variations in design allow for adaptation to vehicle tops of various lengths. There is no apparent means for supporting the cover in an open position while loading.

The Peoples invention is a rather sophisticated system of two transverse bars supported at the ends of two lengthwise triangular members. It appears costly to produce.

Koop's invention is a very specialized device, providing an enclosed storage compartment and an electrically powered winch to raise a wheelchair up and into the compartment. It is not adapted to the storage of conventional luggage items.

Moran's design provides two or more transverse support bars, each being secured to the roof gutters by sheet metal bracket components.

The Weinhold patent covers a toggle clamping device used in conjunction with commercially available cartop carrier bars. The clamps are used to clamp down and secure the article being transported—which must have a suitable flanged portion to accommodate the clamping function.

The present invention is primarily intended to be used on commercial limousines, which typically are elongated versions of a conventional automobile, and carry ten to twelve passengers and their luggage. A common application of these vehicles is the transporting of airline passengers to, from, and between major airline terminals. There is limited interior space for luggage, so most of these vehicles make use of some sort of cartop storage rack. Typically, such a rack consists of a shallow box, four to five inches deep, to hold the luggage items, which are protected from the weather by a cover made of canvas or like material. The canvas cover is secured in place over the luggage by a length of rope or shock cord around its periphery hooked under a series of hooks mounted on the outside surface of the shallow box.

Securing the cover at the point of departure of the limousine and removing it at the destination is a time consuming operation. It can be additional trouble if the limousine makes stops along the way to pick up or discharge passengers. Furthermore, the canvas cover, exposed to the elements, will in time deteriorate and exhibit a limited service life.

It is an object of this invention to provide a cartop luggage carrier, of particular value for limousine service, that permits easy access for loading and unloading.

It is a further object of this invention to provide a luggage carrier with a cover that has an improved service life. A further object is to provide a luggage carrier that is much more secure against damage and vandalism than the canvas covered types in general use.

Yet another object of the invention is to provide a construction that will allow the display of advertising messages that can produce additional revenue for the limousine operators.

Other objects and advantages will become apparent from the detailed description that follows.

SUMMARY OF THE INVENTION

It has now been found that these and other objects of the invention may be attained in a luggage carrier for carrying luggage on the roof of a vehicle which includes a luggage platform, first and second concentric cover sections, and means for mounting each of the cover sections for movement in a first direction. The first and second cover section may have a common axis and the common axis may be aligned with the first direction. The means for mounting each of the cover sections may include roller elements. Front and rear closure elements may be disposed at axially spaced points along the axis. The front and rear closure elements may be fixed with respect to the luggage platform. The luggage platform may further include upstanding sides disposed in generally aligned relationship to the axis. Latch means may join each cover member to at least one of the closure elements. At least one track may be disposed on one side of the luggage platform, the track may be dimensioned and configured for engaging at least one of the rollers. Each of the cover sections may include a plurality of rollers.

A track may also be disposed on the other side of the luggage platform. Each track may have discrete sections for engaging respectively the rollers of the first cover section and the second cover section. The discrete sections of each of the tracks each may have an open face and closed back portion, the backs of the sections may be disposed in back to back relationship in each track. Each of the latch means may include a generally hook shaped elements.

BRIEF DESCRIPTION OF THE DRAWINGS

FIG. 1 is a side view of a luggage carrier made according to this invention.

FIG. 2 is a side view of the luggage carrier of FIG. 1 with its rear section open for loading.

FIG. 3 is a side view of the luggage carrier of FIG. 1 with its forward section open for loading.

DESCRIPTION OF THE PREFERRED EMBODIMENT

Figure 4:
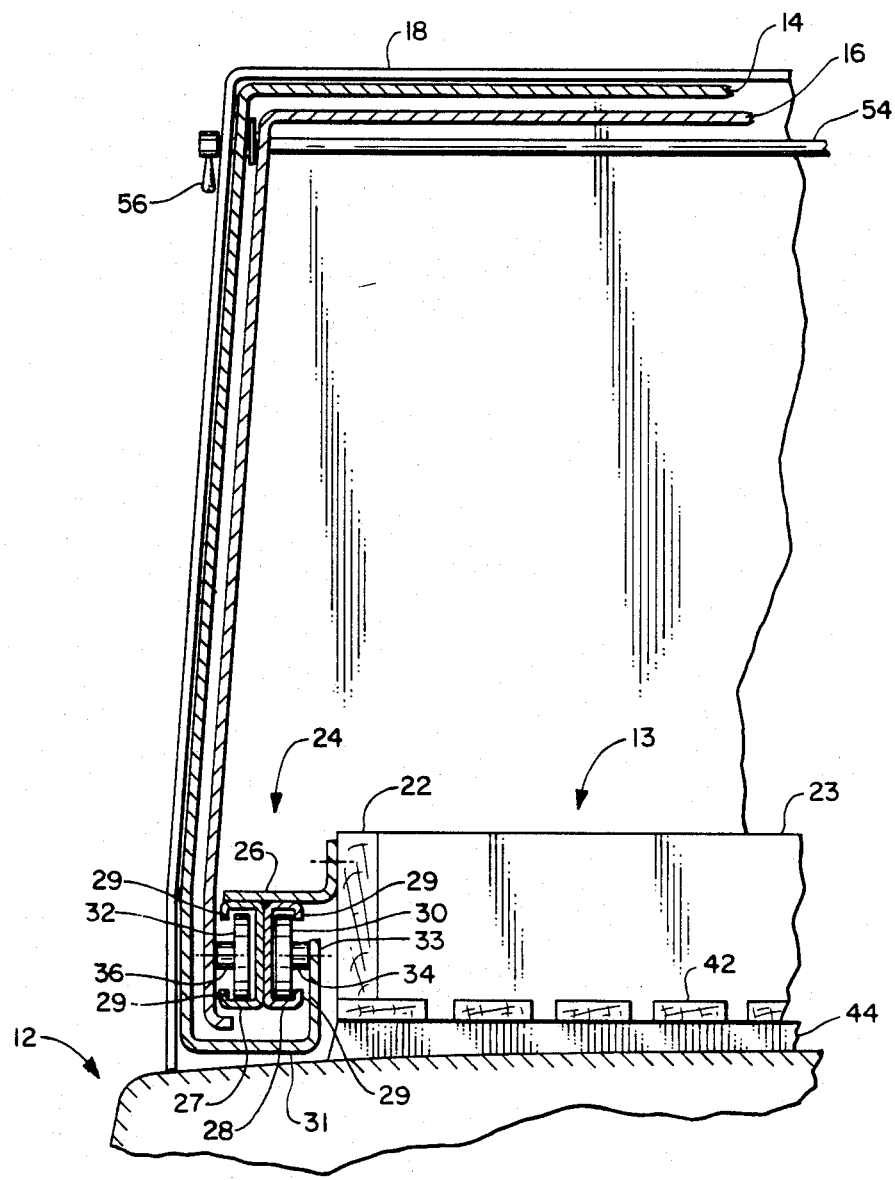
FIG. 4 is a partial section taken along lines 4—4 of FIG. 2.

Referring now to the drawing, a luggage carrier 10 is shown mounted on the roof of limousine 12. The carrier 10 consists of a shallow box, or luggage platform, 13, a forward cover section 14, a rear cover section 16, a forward end section 18, and a rear end section 20.

The luggage platform 13 is comprised of a floor 42, (which may be of slatted construction to permit drainage), vertical side pieces 22, vertical end pieces 23, and two or more transverse support members 44, which are secured directly to the roof of the vehicle.

The front and rear cover sections 14, 16 are essentially inverted channel shapes which nest together (see FIG. 4) and may be formed of sheet metal or molded of fiber reinforced plastic. The end sections 18, 20 may likewise be made of sheet metal or molded plastic. They are sloped downward in the longitudinal direction, both for a more pleasing appearance and to promote smoother air flow.

Along the outer face of each side piece 22 is mounted a horizontal track assembly 24, consisting of a number of brackets 26 which support horizontal full-length, back-to-back channels 27, 28. (See FIG. 4.) Along the lower edge of each of the side portions of cover 16 are located two or more cantilevered shafts 36, each of which carries a wheel or roller 32. The diameter of rollers 32 is such as to fit into the channel 27 and roll freely. The flanges of channel 27 (also channel 28) have re-entrant lips 29 to retain the rollers and permit only a minimal axial shift.

As may be seen in FIG. 4, the lower edge of each of the side portions of cover 14 contains two right angle bends, producing a horizontal portion 31 and a re-entrant vertical portion 33. Along the edge of the vertical portion 33 at least two cantilever shafts 34 and rollers 30 are located—similar to shafts 36 and rollers 32 described above. The rollers 30, 32 may be molded of a plastic such as nylon, or may be anti-friction ball or roller bearings.

When each of the covers 14, 16 have their associated rollers 30, 32 inserted into the appropriate channels 27, 28 it can be seen that the covers 14, 16 are then able to roll freely in a fore and aft direction (with respect the vehicle). Furthermore, due to the roller arrangement and the clearance between the two covers, cover 16 is able to move freely inside cover 14.

This arrangement allows the rear cover 16 to be moved forward under the front cover 14 to provide access to the rear half of the luggage platform, as in FIG. 2. Conversely, the front cover 14 may be moved back over the rear cover 16 to allow access to the front half of the luggage platform 13, as in FIG. 3.

Figure 5:
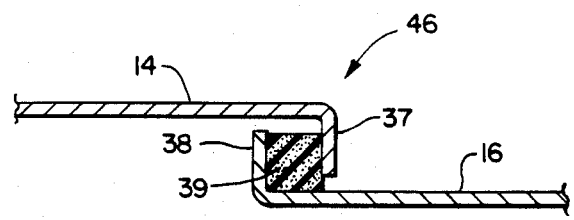
FIG. 5 is a sectional view of a detail of construction.

When the two covers are in the position shown in FIG. 1 (i.e., completely covering the luggage load), means must be provided to protect the contents of the luggage platform 13 from water leakage during wet weather. At the center joint area 46 this is accomplished by the sealing means shown in FIG. 5. An inwardly facing flange 37 is formed around the periphery of the cover 14; an outwardly facing flange 38 is formed on the periphery of the cover 16. A seal element 39 made of a soft, resilient elastomer is bonded to the cover 16 in the inside angle formed by flange 38. As the two covers 14, 16 are drawn into their fully closed position, the seal 39 is compressed slightly to form a seal and prevent water from entering the joint.

Figure 6:
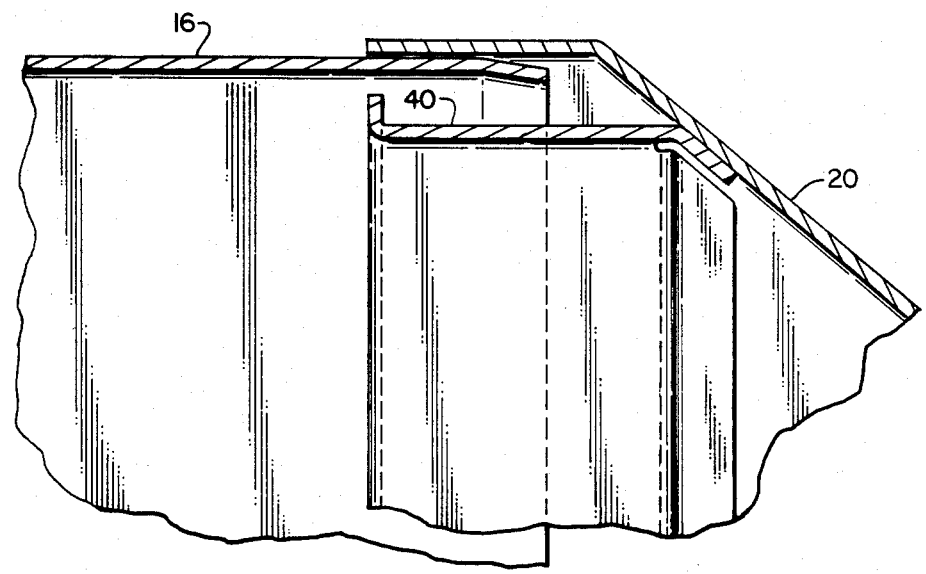
FIG. 6 is a sectional view of another detail of construction.

When the covers 14, 16 are in the fully closed position, the forward edges of the cover 14 and the rear edges of cover 16 slide inside the corresponding end sections 18, 20 forming an overlapping joint. FIG. 6 shows this relationship at the rear end section 20. Clearances between the outer surfaces of the cover 16 and the inner surfaces of the end section 20 are kept to a practical minimum; in addition, a drain channel 40 is affixed to the inside of the rear end section 20. Any water getting past the overlapping joint is caused to drain out and is thereby kept from entering the luggage compartment proper. Construction at the forward end is similar.

Figure 7:
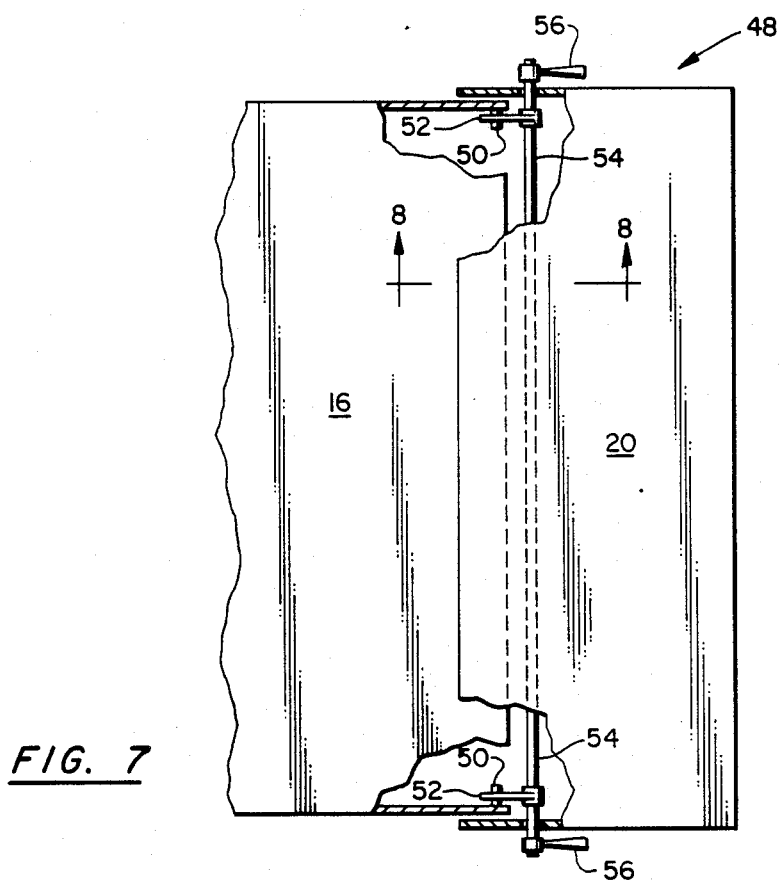
FIG. 7 is a top view of a latch construction.
Figure 8:
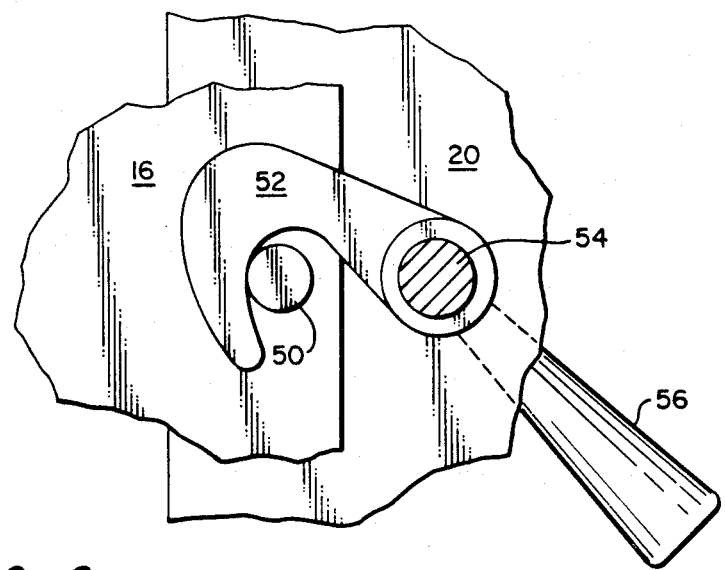
FIG. 8 is a sectional view taken along lines 8—8 in FIG. 7.

FIG. 7 is a top view of the rear portion of the luggage carrier showing the latch mechanism 48 which secures the rear cover 16 to the end section 20 to hold the cover 16 in its fully closed position. FIG. 8 shows the details of the system. A latch hook 52 is rotated approximately 90 degrees clockwise from the position shown to allow the cover 16 to be brought to the closed position. Rotating the hook 52 counter clockwise then allows it to engage pin 50 and hold the cover 16 firmly in place. Rotating the hook is accomplished by use of the handle 56. A shaft 54, to which the hook 52 and the handle 56 are affixed, extends completely across the width of the end section 20. Latching elements are located at both ends of the shaft 54 to provide an even pull on the cover 16. Cover 16 may be latched or released by operating either of the handles 56; it is not necessary to walk around the vehicle to clamp or release each side separately. A similar latch system is used at the front end of the luggage carrier to secure the cover 14 to the end section 18.

As an added feature, the sides of the covers 14, 16 may be used to display an advertising message. This may be advertising for the limousine operating company itself, or may be for other commercial firms, in which case it provides the limousine firm with added revenue. The nature of the limousine operation places it in areas where it is seen by many business-oriented people, and could prove to be a very effective advertising method.

Figure 9:
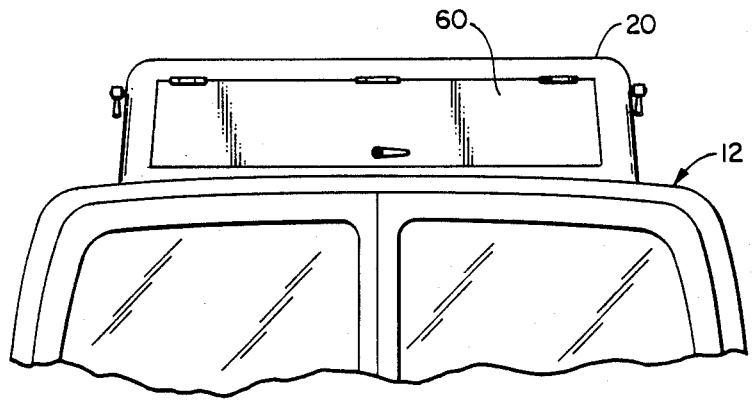
FIG. 9 is partial end elevational view illustrating a door construction feature of one embodiment of the invention installed on a vehicle.
Figure 10:
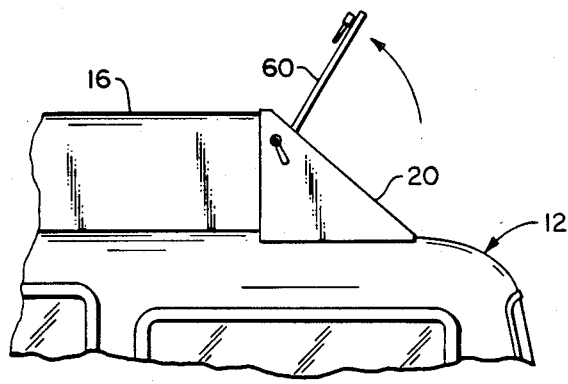
FIG. 10 is a partial side elevational view showing the open positon of the end door illustrated in FIG. 9.

Referring now to FIGS. 9 and 10 there is shown a particulary useful embodiment which includes a rear mounted hinged door 60 that advantageously allows loading of long objects such as skis. Although the door 60 has been shown located at the rear of the carrier it will be understood that various other embodiments may have a door of this type at the front or the back and the front of the carrier 10.

The luggage carrier construction described above may also be adapted for use on a conventional vehicle, particularly a station wagon. For such an application the luggage platform 13 would preferably be secured to the vehicle roof by the conventional methods of attachment to the roof gutters.

While specific embodiments of the invention have been disclosed above, it should be understood that various modifications within the spirit of the invention may occur to those skilled in the art. For example, the cover sections may be plastic formed to engage stationary elements for sliding engagement. Therefore it is intended that no limitations be placed on the invention except as defined by the scope of the appended claims.

Having thus described my invention I claim:

1. A luggage carrier for carrying luggage on the roof of a vehicle which comprises:

a luggage platform;

first and second concentric cover sections;

means for mounting each of said cover sections for movement in a first direction, said first and second cover sections have a common axis and said common axis is aligned with said first direction, said cover sections each including roller elements;

said apparatus further including front and rear closure elements disposed at axially spaced points along said axis, said front and rear closure elements being fixed with respect to said luggage platform, said luggage platform further including upstanding first and second sides disposed in generally aligned relationship to said axis; and latch means for coupling each of said cover sections to at least one of said front and rear closure elements.

2. The apparatus as described in claim 1 further including:

at least one track disposed on said first side, said track being dimensioned and configured for engaging at least one of said roller elements.

3. The apparatus as described in claim 2 further including:

a track disposed on said second side.

4. The apparatus as described in claim 3 wherein:

each track has discrete sections for engaging respectively the roller elements of said first cover section and said second cover section.

5. The apparatus as described in claim 4 wherein:

said discrete sections of each of said tracks each have an open face and a closed back portion, said backs of said sections being disposed in back to back relationship in each track.

6. The apparatus as described in claim 5 wherein:

each of said latch means includes a generally hook shaped element.

7. The apparatus as described in claim 6 further including:

means for sealing and means for directing rain water away from the interior of said apparatus.

8. The apparatus as described in claim 7 wherein:

said roller elements comprise rollers disposed on said cover sections.

9. The apparatus as described in claim 7 further including:

at least one door disposed at one axial extremity of said luggage carrier whereby long objects may be accommodated within said luggage carrier.

10. The apparatus as described in claim 9 wherein:

said door disposed at one axial extremity is hinged along an uppermost surface.

11. The apparatus as described in claim 10 further including:

a generally vertical surface on said luggage carrier whereby advertising displays will be visible to the public.

12. A luggage carrier for carrying luggage on the roof of a vehicle which comprises:

an elongated luggage platform having first and second ends;

first and second cap sections disposed respectively at said first and second ends of said platform, said cap sections being fixed to said platform, at least one of said cap sections including a door whereby elongated baggage may be loaded into said carrier; first and second concentric cover sections, said first and second cover sections have a common axis extending in a first direction;

means for mounting each of said cover sections for movement in a direction aligned with said first direction intermediate said first and second cap sections;

said means for mounting each of said cover sections including roller elements;

said front and rear cap sections being disposed at axially spaced points along said axis.

13. The apparatus as described in claim 12 wherein:

said luggage platform further includes upstanding sides disposed in a generally aligned relationship to said axis.

14. The apparatus as described in claim 13 further including:

latch means for coupling each of said cover sections to at least one of said front and rear cap sections.

15. The apparatus as described in claim 14 further including:

at least one track disposed on one side of said luggage platform, said track being dimensioned and configured for engaging at least one of said roller elements.

16. The apparatus as described in claim 15 wherein:

each of said cover sections includes a plurality of roller elements.

* * * * *